(12) United States Patent
Simpson

(10) Patent No.: US 6,288,364 B1
(45) Date of Patent: Sep. 11, 2001

(54) WELD QUALITY MEASUREMENT

(75) Inventor: Stephen Walter Simpson, Blakehurst (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/402,717

(22) PCT Filed: Apr. 8, 1998

(86) PCT No.: PCT/AU98/00244

§ 371 Date: Nov. 2, 1999

§ 102(e) Date: Nov. 2, 1999

(87) PCT Pub. No.: WO98/45078

PCT Pub. Date: Oct. 15, 1998

(30) Foreign Application Priority Data

Apr. 8, 1997 (AU) .................................................. P0 6073

(51) Int. Cl.⁷ .................................................. B23K 9/095
(52) U.S. Cl. ..................................... 219/130.01; 219/109
(58) Field of Search ............................. 219/130.01, 109, 219/110, 130.21, 130.33

(56) References Cited

U.S. PATENT DOCUMENTS

| | | | |
|---|---|---|---|
| 4,024,371 | * 5/1977 | Drake | 219/110 |
| 4,605,836 | * 8/1986 | Retfalvi et al. | 219/130.01 |
| 4,963,707 | * 10/1990 | Zyokou et al. | 219/110 |
| 5,436,422 | 7/1995 | Nishiwaki et al. | 219/110 |
| 5,521,354 | * 5/1996 | Ludewig et al. | 219/130.01 |
| 5,812,408 | * 9/1998 | Karakama et al. | 219/109 |

FOREIGN PATENT DOCUMENTS

| | | |
|---|---|---|
| 3936329 | 5/1991 | (DE) . |
| 508281A1 | 10/1992 | (EP) . |
| 769343A2 | 4/1997 | (EP) . |
| 2694899 | 2/1994 | (FR) . |
| WO95/07165 | 3/1993 | (WO) . |

* cited by examiner

Primary Examiner—Clifford C. Shaw
(74) Attorney, Agent, or Firm—Howison, Chauza, Thoma, Handley, & Arnott, LLP; Roger N. Chauza, Esq.

(57) ABSTRACT

This invention concerns weld quality measurement. In particular it concerns an apparatus and a process for measuring on-line, while the welding process is under way, the quality of the resulting weldment. The invention is applicable to spray-transfer gas-metal arc welding, short-circuiting transfer gas-metal arc welding, pulse welding, radio-frequency resistance welding and submerged arc welding. It involves the measurement of voltage or current and the generation of an artificial signal for the other. A two dimensional signal analysis then produces data for comparison with data obtained from a high quality weld.

30 Claims, 5 Drawing Sheets

WELD QUALITY MEASUREMENT

TECHNICAL FIELD

This invention concerns weld quality measurement. In particular it concerns an apparatus and a process for measuring on-line, while the welding process is under way, the quality of the resulting weldment. The invention is applicable to gas-metal arc welding, tungsten-inert gas welding, pulsed welding, resistance welding, submerged arc welding and to other welding processes where there is an arc plasma.

BACKGROUND ART

The study of welding and cutting arc phenomena, involves the observation of both voltage and current signals having periods of milliseconds to seconds, or even microseconds. One way of monitoring these signals involves the use of high speed photography, and another is the use of oscillograms. The limitations inherent in the observation techniques and the difficulties in analysing the resulting data, make it difficult to provide a weld quality measurement in real time.

SUMMARY OF THE INVENTION

In a first aspect, the invention is an apparatus for measuring the quality of a weld. The apparatus comprises:

sampling means to sample either the welding current or the welding voltage to provide a series of values for a first signal.

A second sampling means may be employed to measure the other variable to provide a series of values for a second signal. Alternatively, a signal generating means uses the first signal to generate a series of values for an artificial second signal, which depends upon at least some values of the first signal either explicitly or through a recurrence relation. For example, where voltage V is measured, an artificial current I' can be mathematically generated using:

$$I'_n = e^{-\Delta t/\tau} I'_{n-1} - V_n \tag{1}$$

where $\tau$ is a constant which may be selected, and n is the sample number.

This approximation can model the usual inductive-resistive circuit of a power supply but need not be an accurate model since the artificial signal need only provide information about the time history of the sequence.

Using the symbols $D_n$ for the real data sequence and $A_n$ for the artificial sequence, two useful possibilities are $$A_n = e^{-\Delta t/\tau}(A_{n-1} - D_{n-1}) \tag{2}$$

$$A_n = D_{n-k} \tag{3}$$

where integer k>0. The first of these is similar to equation (1). The second possibility is a simple return variable.

Pairing means identify corresponding values of the first and second signals.

Collection means collect pairs of values which are useful for quality monitoring into groups or regions. The pairs collected could be visualised to be those that would fall within selected regions of a two dimensional scatter plot of the values of the first and second signals. The regions could be drawn on to such a visualisation.

The regions need not be of equal size, and they may be smaller where population density is greatest and may be exponentially greater in dimension, in both the voltage and current direction, as they progress away from the point of greatest population density. Once the regions are chosen they are fixed during the monitoring process.

In the case of 'dip' or short circuiting metal transfer in gas metal arc welding, there are large oscillations in voltage and current.

The regions selected will usually be those around the area of greatest density of sample points. However, the regions selected need not be contiguous.

The population of sample points for each selected region can be represented by a two dimensional population density function $f_r$ for a set of regions r=1 to m.

Multiplication means multiply the set of populations $f_q$ by weights $w_{qr}$ defined for the same set of regions, and sum means then sum the products to produce a set of new values for $G_r$, where $$G_r = \sum_{q=1}^{m} w_{qr} f_q \quad \ldots r = 1 \text{ to } m \tag{4}$$

To produce the final adjusted region populations $P_r$ a function F is applied to each of the $G_r$ values:

$$P_r = F(G_r) \ldots r=1 \text{ to } m \tag{5}$$

F is a single-valued monotonic function.

The complete set $\{P_1 \ldots P_m\}$ of the $P_r$ collected is the welding signature.

The weights $w_{qr}$ are chosen to produce a welding signature which contains as much information about the properties of the final weld as possible for a given sampling rate and size. This may be done experimentally, by trial and error adjustment or by knowledge of the physical process. Since there is some statistical noise in the sample, it is useful to choose the $w_{qr}$ to smooth the welding signature. The function F is chosen to maximise the sensitivity of the welding signature to changes in the quality of the final weld.

The sampling means repetitively provides a series of values and a new welding signature is produced for each series. Memory means retain a welding signature $R = \{P_1 \ldots P_m\}$ collected under welding conditions known to be satisfactory and producing a high quality weldment. This may be reference data saved for some time, or could be data collected at the start of a welding run. In the case of a robotic welding, where a sequence of welds is carried out under conditions which may vary, a sequence of reference signatures may be stored and recalled when needed.

The reference signature can also be calculated continuously during welding from previous sampling. In this case the reference is a weighted average of the x signatures $S_1$, $S_2$, $S_3$ . . . $S_x$ where $S_1$ is the most recent signature calculated, $S_2$ is the signature calculated before that and so on. The reference signature R is determined from the weighted average $$r_j = W_1 s_{1j} + W_2 s_{2j} + W_3 s_{3j} + \ldots + W_x s_{xj} \ldots j=1 \text{ to } m \tag{6}$$

where $r_j$ becomes the adjusted region population numbered j in the reference signature R; $s_{1j}$ to $s_{xj}$ are the adjusted region populations numbered j in the signatures $S_1$ to $S_x$ calculated from previous sampling; and $W_1$ to $W_x$ are signature weighting factors. The choice of the signature weighting factors $W_1$ to $W_x$ determines whether the reference represents an average of weld signature behaviour over a relatively long period of time or represents recent welding behaviour.

When signatures are multiplied or divided by a number, it is understood that every adjusted region population in the signature should be multiplied or divided by the number to produce a new signature. Similarly when signatures are added or subtracted, the matching adjusted region populations of each signature are added or subtracted, that is, the adjusted region population numbered j in one signature is added or subtracted from the adjusted region population numbered j in the other signature for j=1, 2 up to m. The equation above can then be written more succinctly as $$R = W_1 S_1 + W_2 S_2 + W_3 S_3 + \ldots + W_x S_x \tag{7}$$

Weld quality result calculation means then compare the welding signatures with the reference welding signature to produce a measure of weld quality.

The part U of a welding signature S which is does not match the reference signature R is given by $$U = S - \frac{(S \cdot R) R}{(R \cdot R)} \tag{8}$$

where A.B is the inner product of two signatures A and B. If U is zero there is a perfect match.

The quality factor q may be defined by $$q = \sqrt{1 - \frac{U \cdot U}{S \cdot S}} \tag{9}$$

$$= \frac{R \cdot S}{\sqrt{R \cdot R} \times \sqrt{S \cdot S}} \tag{10}$$

The quality q will be unity if U is zero and zero if U=S and S.R=0. A value of q=1 would indicate perfect quality. As welding conditions deviate from ideal due to any faults in the welding process, S will no longer match R and q<1.

The inner, or dot, product of any two signatures A and B is defined by:

$$A \cdot B = \sum_{j=1}^{m} a_j \times b_j \tag{11}$$

where $a_j$ and $b_j$ are the adjusted region populations $P_r$ of the signatures A and B respectively.

In another aspect, as currently envisaged, the invention provides a method of measuring weld quality comprising the steps of:

Sampling either the welding current or the welding voltage to provide a series of values for a first signal.

Sampling the other variable to provide a series of values for a second signal.

Alternatively, generating a series of values for the second signal, which depends upon at least some values of the first signal either explicitly or through a recurrence relation.

Pairing corresponding values of the first and second signals.

Collecting pairs of values which are useful for quality monitoring. This step could be visualised to involve plotting a two dimensional scatter plot, of the values of the first and second signals. The plot is then divided into regions. The regions need not be of equal size, and they may be smaller where population density is greatest and may be exponentially greater in dimension in both the voltage and current direction as they progress away from the point of greatest population density. Once the regions are chosen they are fixed during the monitoring process. The regions selected will usually be those around the area of greatest density of sample points. However, the regions selected need not be contiguous.

The process then continues by representing the population of sample points for each selected region by a two dimensional population density function $f_r$ for a set of regions r=1 to m.

Multiplying the set of populations $f_q$ by weights $W_{qr}$ defined for the same set of regions.

Summing the products to produce a set of new values for $G_r$, where $$G_r = \sum_{q=1}^{m} w_{qr} f_q \ldots r = 1 \text{ to } m \tag{12}$$

Applying a function F to each of the $G_r$ to produce the adjusted region populations $P_r$:

$$P_r = F(G_r) \ldots r=1 \text{ to m} \tag{13}$$

Identifying the complete set $\{P_1 \ldots P_m\}$ of the $P_r$ collected as the welding signature.

Repetitively sampling series of values to provide successive welding signatures.

Storing a welding signature $R = \{P_1 \ldots P_m\}$ collected under welding conditions known to be satisfactory and producing a high quality weldment, or, alternatively, calculating a weighted average reference from previous signatures.

Comparing the welding signatures with the reference welding signature to produce a measure of weld quality

BRIEF DESCRIPTION OF THE DRAWINGS

An example of the invention will now be described with reference the accompanying drawings, in which.

BEST MODES FOR CARRYING OUT THE INVENTION

In short-circuiting transfer in gas-metal arc welding, short circuiting occurs repetitively. The voltage wave form will as a result show generally rectangular pulses at about 20 volts separated by regions where the voltage falls to near zero. This voltage is sampled (s) 1024 times with a sampling time interval ($\Delta t$) of 0.5 milli-seconds over a sampling period (T) of 0.5115 seconds (T=(s−1).$\Delta t$).

It may not be convenient to collect current signals as well because measuring the arc current would require costly hardware such as a current transformer.

A synthetic current signal $A_n$ is generated from the sampled voltage signal $D_u$ that has been measured using the following formula:

$$A_n = e^{-\Delta t/\tau}(A_{n-1} - D_{n-1}) \tag{14}$$

where $\tau$ is the welding circuit time constant selected to be equal to four times the sampling interval; about 2 milli-seconds, The first artificial value $A_1$ may be set to zero.

Figure 1:
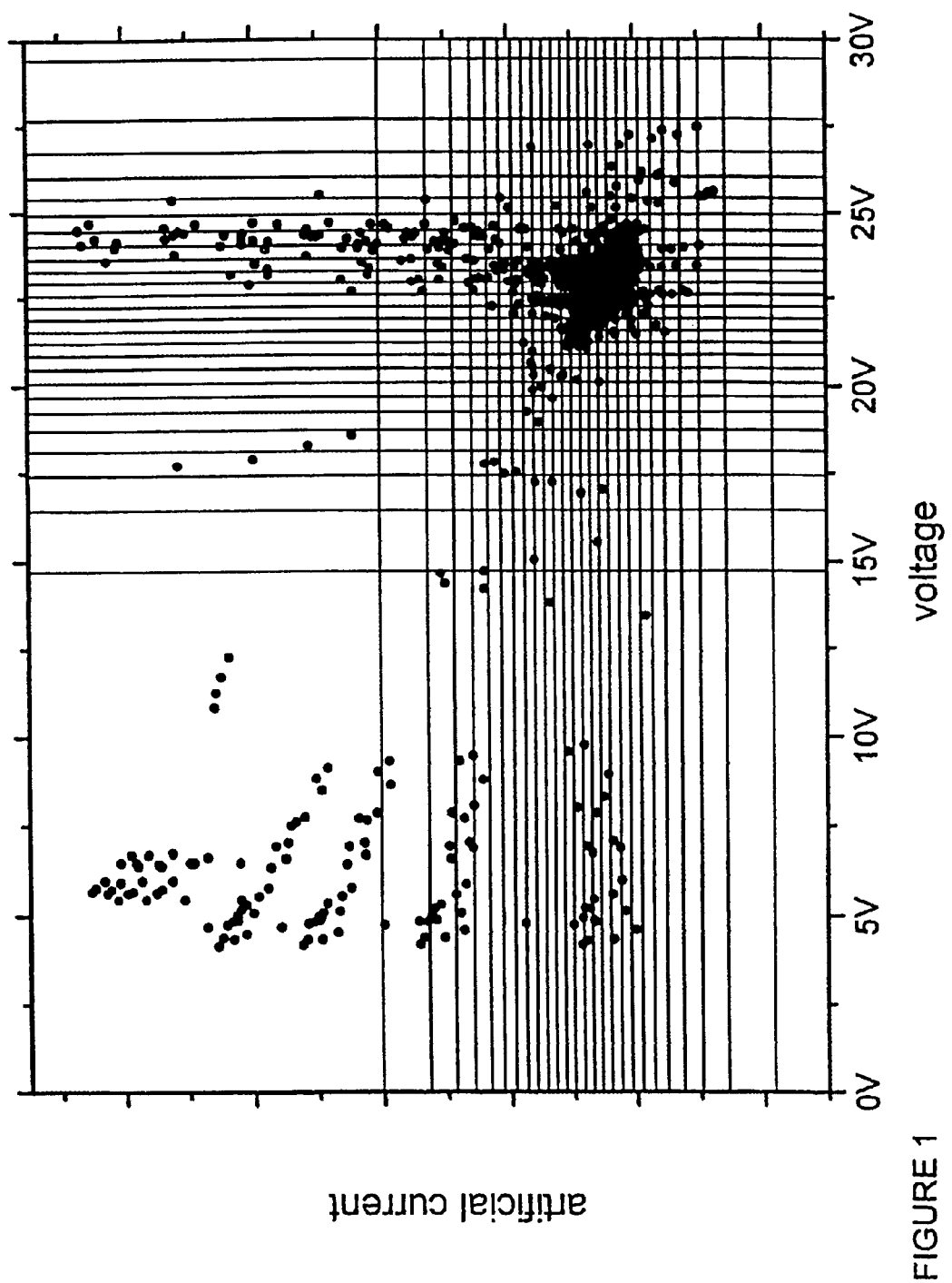
FIG. 1 is a two dimensional scatter plot of measured voltage and synthetic current.

The artificial current values may then be plotted against the voltage values as shown in FIG. 1 in order to visualise the process.

The plot shown in FIG. 1 is then divided in to rectangular regions of varying sizes.

The regions are chosen adaptively, based on the data itself. From a given set of reference data, a point $(D_0, A_0)$ is chosen to be at the mode of the sampled distribution; that is the point where the most data lies. The regions are chosen to have a width in the D direction which is smallest near the mode and tends to infinity at the edge regions. This means that resolution is improved where many data points are present. The width function is such that the width of the interval located at $D_w$ is proportional to:

$$e^{\alpha(D_w-D_0)^2/(\Delta D)^2} \quad (15)$$

where $\Delta D$ is the standard deviation of the $D_n$, the set of values of the sampled voltage signal, and a is constant (set to unity in this example). An analogous procedure is used to set the height of the rectangular populations in the A direction, and there are a total of m (=27×27) which equals 729 rectangular population regions.

Figure 2:
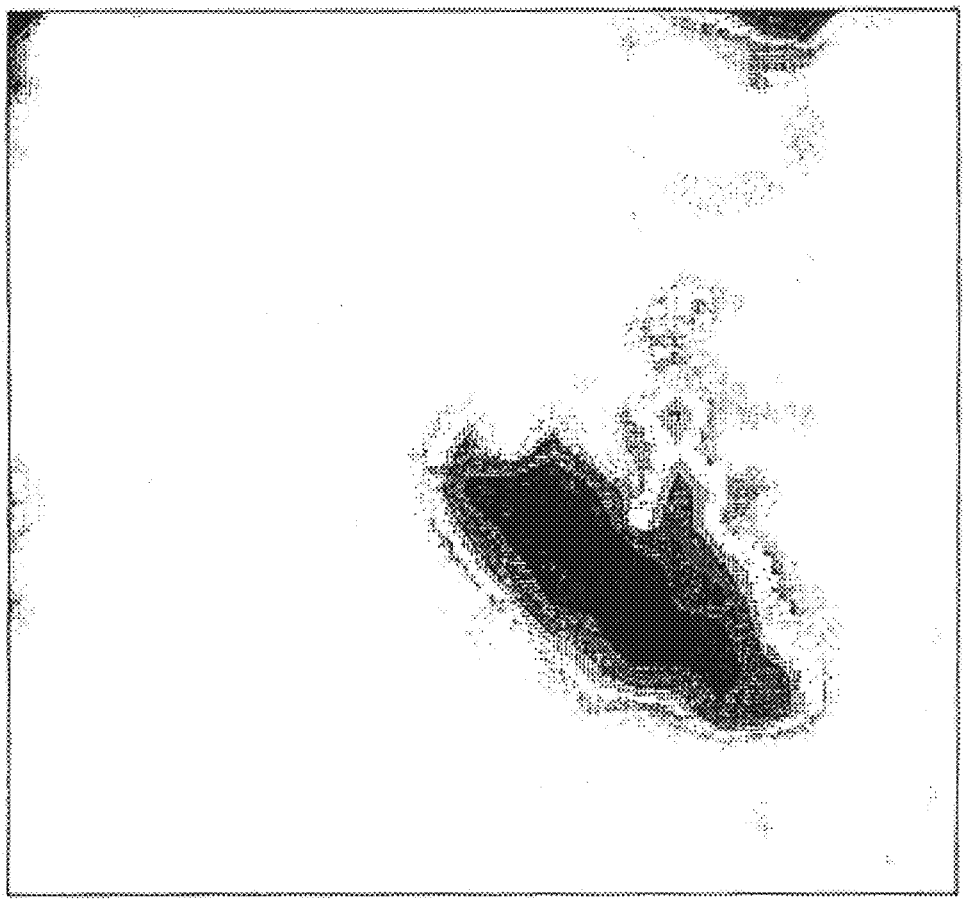
FIG. 2 is a population density distribution of selected regions of FIG. 1.

The raw population density distribution resulting is shown in FIG. 2.

Once the population regions are chosen, they are fixed during the monitoring process, the same for both the reference signature and the monitored signatures.

Weights $w_{qr}$ are set to smooth the population distribution of the chosen regions in two dimensions, and the weights are selected according to:

$$w_{qr}=e^{-\beta(D_q-D_r)^2/(\Delta D)^2-\beta(A_q-A_r)^2/(\Delta A)^2} \quad (16)$$

where $\Delta A$ is the standard deviation of the $A_n$, the set of calculated values of the artificial current, and $\beta$ is a constant which determines the degree of smoothing (set to 25 in this example). $(D_q, A_q)$ and $(D_r, A_r)$ are the locations of the two regions q and r.

Once the weights are chosen, they are fixed during the monitoring process, the same for both the reference signature and the monitored signature.

Figure 3:
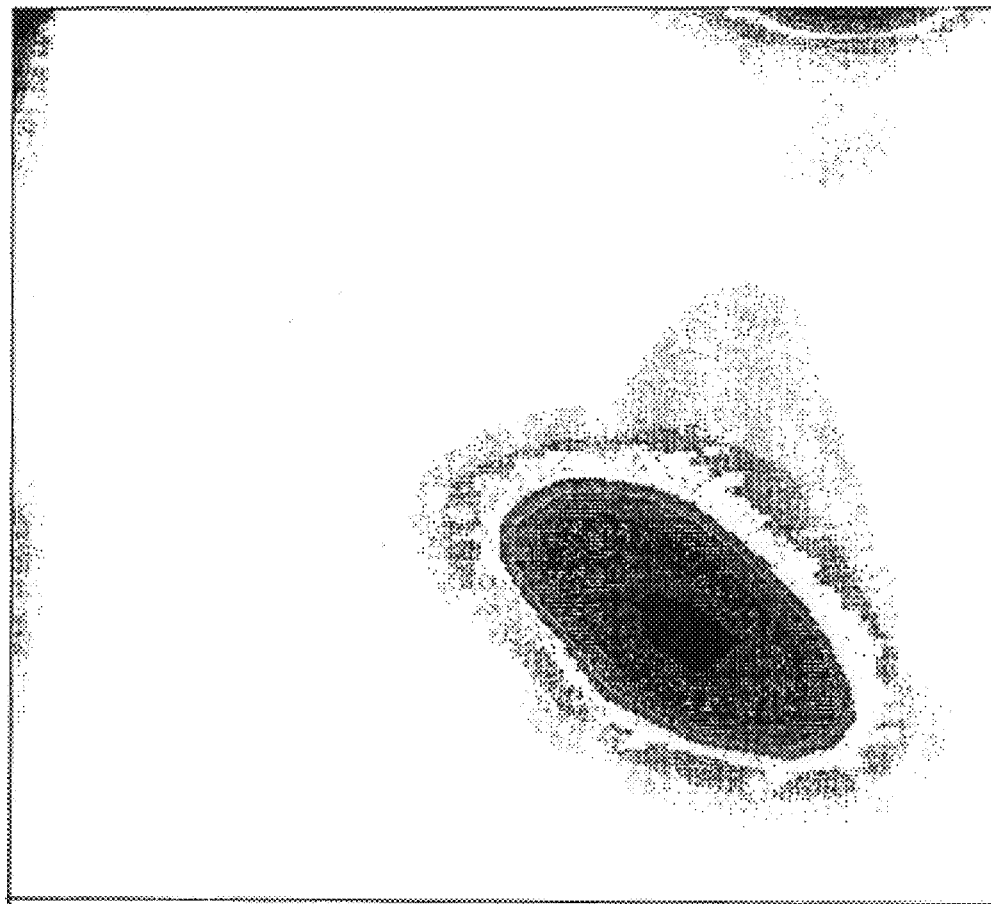
FIG. 3 is a weighted version of the population density of FIG. 2.

The smoothed distribution, the set of region populations $\{G_1 \ldots G_m\}$ is shown in FIG. 3. The set of adjusted region populations $P_r$ is then calculated by applying the function F to the $G_r$ values:

$$P_r=F(G_r) \ldots r=1 \text{ to } m \quad (17)$$

The single-valued monotonic function F is chosen to maximise the sensitivity of the welding signature to changes in the quality of the final weld. The function F may be chosen be a power law: $F(x)=x^\lambda$ where $\lambda$ is fixed, with the additional special value $F(0)=0$. If $0<\lambda<1$, regions with low populations are emphasised in the welding signature, which can improve the sensitivity of the technique. $\lambda=0.6$ has been found to be a suitable choice.

Figure 4:
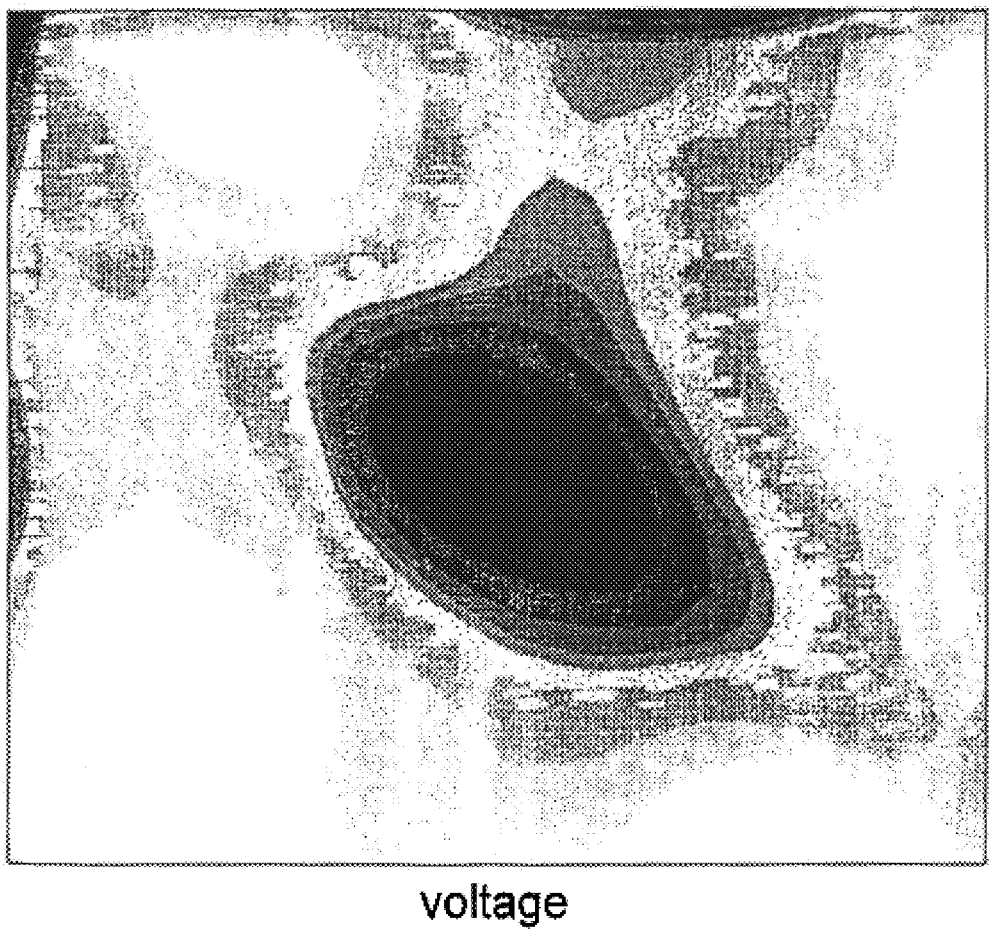
FIG. 4 is an adjusted version of the population density of FIG. 3 and shows a welding signature.

The set of adjusted region populations $\{P_1 \ldots P_m\}$, which is the final welding signature is shown in FIG. 4. This can be compared with the signature from a reference weld.

Welding quality can be ascertained by an inspection of FIG. 4, but it is convenient to calculate a quality indicator q, defined by:

$$q = \frac{R \cdot S}{\sqrt{R \cdot R} \times \sqrt{S \cdot S}} \quad (18)$$

where R is a reference weld signature, S is a measured weld signature, and the inner, or dot, product of any two signatures A and B is defined by:

$$A \cdot B = \sum_{j=1}^{m} a_j \times b_j \quad (19)$$

where $a_j$ and $b_j$ are the adjusted region populations of the signatures A and B respectively.

The weld quality measurement could be fed back in some way to control the welding operation if required.

The invention may also be applied to situations using multiple references.

Suppose $R_1$ and $R_2$ are the two reference signatures, recorded and stored during a welding run which produced a high-quality weldment. They should reflect the range of expected normal variation during the welding run.

Examples are:

(a) changes in joint geometry/surface condition and welding head orientation such as might happen with robotic welding of a complex work piece.

(b) programmed lead in or shut down sequences, or programmed changes in the operating conditions.

(c) unintentional changes in welding, for example due to work piece heating through a run, which nevertheless do not degrade weld quality.

A signature S has been collected during another run and is to be compared with $R_1$ and $R_2$.

Definition:

A normalised or unit signature U' is calculated from any signature U as $$U' = \frac{U}{\sqrt{U \cdot U}} \quad (20)$$

A signature P orthogonal to $R_1$ is given by $$P = R_2 - \frac{R_1 \cdot R_2}{R_1 \cdot R_1} R_1 \quad (21)$$

P will be nonzero provided $R_1$ and $R_2$ are independent signatures, that is, not the same signature or signatures whose elements, the adjusted region populations, differ from each other by a constant multiplying factor.

P' and $R_1'$ are orthogonal unit signatures in the two-dimensional linear signature subspace defined by $R_1$ and $R_2$. The component B of S' which lies in the subspace is $$B=(S' \cdot R_1')R_1'+(S' \cdot P')P' \quad (22)$$

The component C of S' which is orthogonal to the subspace is $$C=S'-B \quad (23)$$

If C is non-zero, then the welding conditions deviate from the ideal and C can be used as part of a measure of weld quality.

Figure 5:
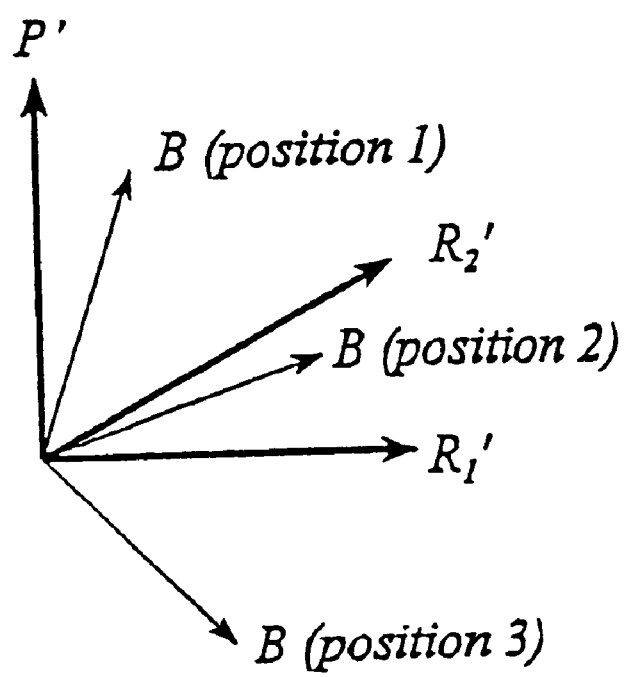
FIG. 5 is a graphical representation of a two dimensional subspace of reference signatures.

FIG. 5 illustrates the two dimensional subspace of the reference signatures with three possible locations for B. If B is inside the angle is subtended by $R_1'$ and $R_2'$ (position 2), then the quality of the weld is satisfactory as far as the component B is concerned since the normalised welding signature is expected to move between $R_1'$ and $R_2'$ during normal welding as conditions change. However of B is in either of positions 1 or 3, this represents a discrepancy from ideal in addition to the discrepancy associated with non-zero C. Using the fact that the adjusted region populations making up the signatures are never negative, the condition that B lies between $R_1'$ and $R_2'$ can be written $$(R'_2-R'_1).(B'-R'_1)>0 \text{ and } (R'_1-R'_2).(B'-R'_2)>0 \tag{24}$$

If this condition is satisfied then C gives the part of the measured signature which differs from the reference signatures and the quality q becomes $$q=\sqrt{1-C.C} \tag{25}$$

Conversely, if the above conditions are not both satisfied, then either $R_1'$ or $R_2'$ will be closest to S' and the quality q should be taken as the larger of $R_1'.S'$ and $R_2'.S'$. These are the same values as would result from using a single reference of $R_1$ or $R_2$ respectively.

The above considerations can be extended to a three-reference system, $R_1$, $R_2$, and $R_3$. The component of S' in the three-dimensional subspace generated by $R_1$, $R_2$, and $R_3$ is $$B=(S'.R'_1)R'^1+(S'.P'_1)P'_1+(S'.P'_{12})P'_{12}$$

where $$P_1=R_2-(R'_1.R_2)R'_1$$

$$P_{12}=P_2-(P'_1.P_2)P'_1$$

with $$P_2=R_3-(R'_1.R_3)R'_1 \tag{26}$$

Again the component of S' orthogonal to the subspace is C=S'-B. An approximate set of conditions for vector B' to lie within the solid region formed by $R_1$, $R_2$, and $R_3$ is $$(S'-R'_1)\cdot\left(R'_3-R'_1-\frac{(R'_3-R'_1)\cdot(R'_2-R'_1)}{(R'_2-R'_1)\cdot(R'_2-R'_1)}(R'_2-R'_1)\right)>0 \tag{27}$$

and $$(S'-R'_2)\cdot\left(R'_1-R'_2-\frac{(R'_1-R'_2)\cdot(R'_3-R'_2)}{(R'_3-R'_2)\cdot(R'_3-R'_2)}(R'_3-R'_2)\right)>0 \tag{28}$$

and $$(S'-R'_3)\cdot\left(R'_2-R'_3-\frac{(R'_2-R'_3)\cdot(R'_1-R'_3)}{(R'_1-R'_3)\cdot(R'_1-R'_3)}(R'_1-R'_3)\right)>0 \tag{29}$$

If these conditions are all satisfied then the quality q is given by $$q=\sqrt{1-C.C} \tag{30}$$

Conversely, if the three conditions are not all satisfied then the quality should be calculated successively for the three pairs of references $R_1$ and $R_2$; $R_2$ and $R_3$; and $R_1$ and $R_3$, using the method already defined for a pair of references. The largest of the three resultant quality estimates is taken to be the final quality.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An apparatus for measuring the quality of a weld, comprising:

sampling means to sample either the welding current or the welding voltage to provide a series of values for a first signal;

a second sampling means to sample the welding voltage or the welding current, whichever is not sampled by the sampling means, to provide a series of values for a second signal;

collection means to collect pairs of values of the first and second signals which are useful for quality monitoring into groups;

calculation means to multiply values of the two dimensional group populations for each group by a weighting factor and to sum the products for each group;

memory means to store a reference set of the resultant adjusted group populations collected for a high quality weldment; and comparison means to compare the reference set of adjusted group populations with another set produced by the calculation means to provide a measure of weld quality for the weld from which the other set was produced.

2. An apparatus for measuring the quality of a weld, comprising:

sampling means to sample either the welding current or the welding voltage to provide a series of values for a first signal;

a signal generating means to use the first signal to generate a series of values for an artificial second signal, which depends upon at least some values of the first signal either explicitly or through a recurrence relation;

collection means to collect pairs of values of the first and second signals which are useful for quality monitoring into groups;

calculation means to multiply values of the two dimensional group populations for each group by a weighting factor and to sum the products for each group;

memory means to store a reference set of the resultant adjusted group populations collected for a high quality weldment; and comparison means to compare the reference set of adjusted group populations with another set produced by the calculation means to provide a measure of weld quality for the weld from which the other set was produced.

3. Apparatus according to claim 2, wherein the values $A_n$ of the artificial signal are given by $$A_n=e^{-\Delta t/\tau}A_{n-1}-D_n$$

where $D_n$ are the values of the first signal where $\tau$ is a time constant and n is the sample number.

4. An apparatus according to claim 2, wherein the values $A_n$ of the artificial signal are given by:

$$A_n=e^{-\Delta t/\tau}(A_{n-1}-D_{n-1})$$

where $\tau$ is the welding circuit time constant and n is the sample number.

5. An apparatus according to claim 2, wherein the values $A_n$ of the artificial signal are given by:

$$A_n=D_{n-k}$$

where $D_n$ are the values of the first signal and k>0.

6. An apparatus according to any preceding claim, wherein the groups of pairs collected by the collection means are those that fall within selected regions of a two dimensional histogram of the values of the first and second signals.

7. An apparatus according to claim 6, wherein the regions are not of equal size.

8. An apparatus according to claim 7, wherein the regions are smaller where the density of sample points is greater.

9. An apparatus according to claim 6, wherein the regions selected are those having the greatest density of sample points.

10. An apparatus according to claim 1 or 2, wherein the calculation means sums the group population densities $f_q$ weighted by weighting factors $w_{qr}$ for a set of in regions to produce a set of weighted group populations $G_1$, $G_2$ to $G_m$ according to:

$$G_r = \sum_{q=1}^{m} w_{qr} f_q \ldots r = 1 \text{ to } m$$

11. An apparatus according claim 10, wherein the calculation means also applies a monotonic single-valued function F to each of the $G_r$ values to produce the set of values $P_1$, $P_2$ to $P_m$ according to:

$$P_r = F(G_r) \ldots r=1 \text{ to } m$$

and the set $P_1$, $P_2$ to $P_m$ is the welding signature.

12. An apparatus according to claim 11, wherein the comparison means compares a welding signature produced from a reference set of weighted group populations with a welding signature produced from another set.

13. An apparatus according to claim 12, wherein there is a single reference signature R, a welding signature S of a weld and a quality factor q of the weld is defined to be $$q = \frac{R \cdot S}{\sqrt{R \cdot R} \times \sqrt{S \cdot S}}$$

where the inner, or dot, product of any two signatures A and B is defined by:

$$A \cdot B = \sum_{j=1}^{m} a_j \times b_j$$

and $a_j$ and $b_j$ are the $P_r$ of the signatures A and B respectively.

14. An apparatus according to claim 12, wherein there are two reference signatures $R_1$ and $R_2$, a welding signature S of a weld and a quality factor q of the weld is defined as follows a normalised or unit signature U' is calculated from any signature U as $$U' = \frac{U}{\sqrt{U \cdot U}}$$

a signature P orthogonal to $R_1$ is given by $$P = R_2 - \frac{R_1 \cdot R_2}{R_1 \cdot R_1} R_1$$

where the inner, or dot, product of any two signatures A and B is defined by:

$$A \cdot B = \sum_{j=1}^{m} a_j \times b_j$$

and $a_j$ and $b_j$ are the $P_r$ of the signatures A and B respectively,

P will be nonzero provided $R_1$ and $R_2$ are independent signatures, that is, not the same signature or signatures whose elements, the adjusted region populations, differ from each other by a constant multiplying factor;

P' and $R_1$' are orthogonal unit signatures in the two-dimensional linear signature subspace defined by $R_1$ and $R_2$, and the component B of S' which lies in the subspace is

B=(S'.R'$_1$)R'$_1$+(S'.P')P' the component C of S' which is orthogonal to the subspace is

C=S'-B the condition that B lies between $R_1$' and $R_2$' can be written (R'$_2$-R'$_1$).(B'-R'$_1$)>0 and (R'$_1$-R'$_2$).(B'-R'$_2$)>0 if this condition is satisfied then C gives the part of the measured signature which differs from the reference signatures and the quality q becomes q=$\sqrt{C.C}$ conversely, if the above conditions are not both satisfied, then the quality q is taken as the larger of $R_1$'.S' and $R_2$'.S'.

15. An apparatus according to claim 12, wherein there are three reference signatures $R_1$, $R_2$ and $R_3$, a welding signature S of a weld and a quality factor q of the weld is defined as follows a normalised or unit signature U' is calculated from any signature U as $$U' = \frac{U}{\sqrt{U \cdot U}}$$

a signature P orthogonal to $R_1$ is given by $$P = R_2 - \frac{R_1 \cdot R_2}{R_1 \cdot R_1} R_1$$

where the inner, or dot, product of any two signatures A and B is defined by:

$$A \cdot B = \sum_{j=1}^{m} a_j \times b_j$$

and $a_j$ and $b_j$ are the $P_r$ of the signatures A and B respectively, the component of S' in the three-dimensional subspace generated by $R_1$, $R_2$, and $R_3$ is

B=(S'.R'$_1$)R'$_1$+(S'.P'$_1$)P'$_1$+(S'.P'$_{12}$)P'$_{12}$ where

P$_1$=R$_2$-(R'$_1$.R$_2$)R'$_1$

P$_{12}$=P$_2$-(P'$_1$.P$_2$)P'$_1$ with

P$_2$=R$_3$-(R'$_1$.R$_3$)R'$_1$ the component of S' orthogonal to the subspace is C=S'-B, and an approximate set of conditions for vector B' to lie within the solid region formed by $R_1$, $R_2$, and $R_3$ is $$(S'-R'_1) \cdot \left( R'_3 - R'_1 - \frac{(R'_3-R'_1)\cdot(R'_2-R'_1)}{(R'_2-R'_1)\cdot(R'_2-R'_1)}(R'_2-R'_1) \right) > 0 \text{ and}$$

$$(S'-R'_2) \cdot \left( R'_1 - R'_2 - \frac{(R'_1-R'_2)\cdot(R'_3-R'_2)}{(R'_3-R'_2)\cdot(R'_3-R'_2)}(R'_3-R'_2) \right) > 0 \text{ and}$$

$$(S'-R'_3) \cdot \left( R'_2 - R'_3 - \frac{(R'_2-R'_3)\cdot(R'_1-R'_3)}{(R'_1-R'_3)\cdot(R'_1-R'_3)}(R'_1-R'_3) \right) > 0$$

if these conditions are all satisfied then the quality q is given by $$q = \sqrt{1-C \cdot C}$$

conversely, if the three conditions are not all satisfied then the quality is calculated successively for the three pairs of references $R_1$ and $R_2$; $R_2$ and $R_3$ and $R_1$ and $R_3$, using the method of claim 13 and the largest of the three resultant quality estimates is taken to be the final quality.

16. A method of measuring weld quality comprising the steps of:

sampling either the welding current or the welding voltage to provide a series of values for a first signal;

sampling the welding voltage or the welding current, whichever has not already been sampled, to provide a series of values for a second signal;

pairing corresponding values of the first and second signals, collecting pairs of values which are useful for quality monitoring into groups;

calculating the products of the two dimensional group populations with fixed weights defined for the same groups and summing the products for each group to produce a new set of weighted group populations;

storing a reference set of adjusted group populations obtained from producing a high quality weldment, or, alternatively, determining a reference set from a weighted average of sets of adjusted group populations calculated previously; and comparing the reference set of adjusted group populations with another set to produce a measure of weld quality for the weld from which the other set was produced.

17. A method of measuring weld quality comprising the steps of:

sampling either the welding current or the welding voltage to provide a series of values for a first signal;

generating a series of values for an artificial second signal, which depends upon at least some values of the first signal either explicitly or through a recurrence relation;

pairing corresponding values of the first and second signals;

collecting pairs of values which are useful for quality monitoring into groups;

calculating the products of the two dimensional group populations with fixed weights defined for the same groups and summing the products for each group to produce a new set of weighted group populations;

storing a reference set of adjusted group populations obtained from producing a high quality weldment, or, alternatively, determining a reference set from a weighted average of sets of adjusted group populations calculated previously; and comparing the reference set of adjusted group populations with another set to produce a measure of weld quality for the weld from which the other set was produced.

18. A method according to claim 17, wherein the values $A_n$ of the artificial signal are given by:

$$A_n = e^{-\Delta t/\tau} A_{n-1} - D_n$$

where $D_n$ are the values of the first signal where $\tau$ is the welding circuit time constant and n is the sample number.

19. A method according to claim 17, wherein the values $A_n$ of the artificial signal are given by:

$$A_n = e^{-\Delta t/\tau}(A_{n-1} - D_{n-1})$$

where $\tau$ is the welding circuit time constant and n is the sample number.

20. A method according to claim 17, wherein the values $A_n$ of the artificial signal are given by:

$$A_n = D_{n-k}$$

where $D_n$ are the values of the first signal and $k>0$.

21. A method according to any one of claims 16 to 20, wherein the groups of pairs collected by the collection means are those that fall within selected regions of a two dimensional histogram of the values of the first and second signals.

22. A method according to claim 21, wherein the regions are not of equal size.

23. A method according to claim 22, wherein the regions are smaller where the density of sample points is greater.

24. A method according to claim 21, wherein the regions selected are those having the greatest density of sample points.

25. A method according to claim 16 or 17, wherein the calculating step sums the group population densities $f_q$ weighted by weighting factors $w_{qr}$ for a set of in groups to produce a set of weighted group populations, according to:

$$G_r = \sum_{q=1}^{m} w_{qr} f_q \ldots r = 1 \text{ to } m$$

26. A method according to claim 25, wherein the calculating step also applies a fixed monotonic single valued function F to each of the weighted group populations $G_r$ to produce a new set of adjusted group populations $P_r$, according to:

$$P_r = F(G_r) \ldots r=1 \text{ to } m$$

and the set $P_1$, $P_2$ to $P_m$ is the welding signature.

27. A method according to claim 26, wherein the comparing step compares a welding signature produced from the reference set of adjusted group populations with a welding signature produced from another set.

28. A method according to claim 27, wherein there is a single reference signature R, a welding signature S of a weld and a quality factor q of the weld is defined to be $$q = \frac{R \cdot S}{\sqrt{R \cdot R} \times \sqrt{S \cdot S}}$$

where R is a reference weld signature, S is a measured weld signature, and the inner, or dot, product of any two signature A and B is defined by:

$$A \cdot B = \sum_{j=1}^{m} a_j \times b_j$$

where $a_j$ and $b_j$ are the adjusted region populations of the signatures A and B respectively.

29. An method according to claim 27, wherein there are two reference signatures $R_1$ and $R_2$, a welding signature S of a weld and a quality factor q of the weld is defined as follows a normalised or unit signature U' is calculated from any signature U as $$U' = \frac{U}{\sqrt{U \cdot U}}$$

a signature P orthogonal to $R_1$ is given by $$P = R_2 - \frac{R_1 \cdot R_2}{R_1 \cdot R_1} R_1$$

where the inner, or dot, product of any two signatures A and B is defined by:

$$A \cdot B = \sum_{j=1}^{m} a_j \times b_j$$

and $a_j$ and $b_j$ are the $P_r$ of the signatures A and B respectively,

P will be nonzero provided $R_1$ and $R_2$ are independent signatures, that is, not the same signature or signatures whose elements, the adjusted region populations, differ from each other by a constant multiplying factor;

P' and $R_1$' are orthogonal unit signatures in the two-dimensional linear signature subspace defined by $R_1$ and $R_2$, and the component B of S' which lies in the subspace is

B=(S'.$R'_1$)$R'_1$+(S'.P')P' the component C of S' which is orthogonal to the subspace is

C=S'-B the condition that B lies between $R_1$' and $R_2$' can be written ($R'_2$-$R'_1$).(B'-$R'_1$)>0 and ($R'_1$-$R'_2$).(B'-$R'_2$)>0 if this condition is satisfied then C gives the part of the measured signature which differs from the reference signatures and the quality q becomes q=√1−C.C conversely, if the above conditions are not both satisfied, then the quality q is taken as the larger of $R_1$'.S' and $R_2$'.S'.

30. An method according to claim 27, wherein there are three reference signatures $R_1$, $R_2$ and $R_3$, a welding signature S of a weld and a quality factor q of the weld is defined as follows a normalised or unit signature U' is calculated from any signature U as $$U' = \frac{U}{\sqrt{U \cdot U}}$$

a signature P orthogonal to $R_1$ is given by $$P = R_2 - \frac{R_1 \cdot R_2}{R_1 \cdot R_1} R_1$$

where the inner, or dot, product of any two signatures A and B is defined by:

$$A \cdot B = \sum_{j=1}^{m} a_j \times b_j$$

and $a_j$ and $b_j$ are the $P_r$ of the signatures A and B respectively, the component of S' in the three-dimensional subspace generated by $R_1$, $R_2$, and $R_3$ is

B=(S'.$R'_1$)$R'_1$+(S'.$P'_1$)$P'_1$+(S'.$P'_{12}$)$P'_{12}$ where $P_1$=$R_2$−($R'_1$.$R_2$)$R'_1$ $P_{12}$=$P_2$−($P'_1$.$P_2$)$P'_1$ with $P_2$=$R_3$−($R'_1$.$R_3$)$R'_1$ the component of S' orthogonal to the subspace is C=S'-B, and an approximate set of conditions for vector B' to lie within the solid region formed by $R_1$, $R_2$, and $R_3$ is $$(S'-R'_1) \cdot \left(R'_3 - R'_1 - \frac{(R'_3-R'_1)\cdot(R'_2-R'_1)}{(R'_2-R'_1)\cdot(R'_2-R'_1)}(R'_2-R'_1)\right) > 0 \text{ and}$$

$$(S'-R'_2) \cdot \left(R'_1 - R'_2 - \frac{(R'_1-R'_2)\cdot(R'_3-R'_2)}{(R'_3-R'_2)\cdot(R'_3-R'_2)}(R'_3-R'_2)\right) > 0 \text{ and}$$

$$(S'-R'_3) \cdot \left(R'_2 - R'_3 - \frac{(R'_2-R'_3)\cdot(R'_1-R'_3)}{(R'_1-R'_3)\cdot(R'_1-R'_3)}(R'_1-R'_3)\right) > 0$$

if these conditions are all satisfied then the quality q is given by q=√1−C.C conversely, if the three conditions are not all satisfied then the quality is calculated successively for the three pairs of references $R_1$ and $R_2$; $R_2$ and $R_3$; and $R_1$ and $R_3$, using the method of claim 27 and the largest of the three resultant quality estimates is taken to be the final quality.

* * * * *

UNITED STATES PATENT AND TRADEMARK OFFICE
CERTIFICATE OF CORRECTION

PATENT NO. : 6,288,364 B1
DATED : September 11, 2001
INVENTOR(S) : Stephen W. Simpson It is certified that error appears in the above-identified patent and that said Letters Patent is hereby corrected as shown below:

Column 2,
Line 48, the subscript "X" should be a lower case -- x --.

Column 3,
Line 19, the dot between the "A" and "B" should be centered vertically, such as -- A·B --;
Line 31, the dot between the "S" and "R" should be centered vertically.

Column 4,
Line 5, the "W" should be lower case.

Column 5,
Line 4, the dot in the parenthetical expression should be a comma;
Line 28, (equation 16), the entire expression after the superscript Greek symbol "beta" should also be a superscript horizontally aligned with the "beta" symbol.

Column 6,
Line 49, (equation 22), the two dots in the expression should be vertically centered.

Column 7,
Lines 4, (equation 24), 9 (equation 25), 20, 23, 25 and 29 (equation 26), the dots should be vertically centered.
Line 29, delete "(26)" and insert -- (26) -- after the equation on line 20.

Column 9,
Line 8, "in" should be -- m --.

Column 10,
In the equations on lines 10, 18, 23, 55, 58, 60 and 63, the dots should be vertically centered;
Line 23, in the equation, in the expression in the radical symbol, should be a minus sign between the "1" and the first occurrence of "C";
Line 26, in both expressions the dots should be vertically centered.

UNITED STATES PATENT AND TRADEMARK OFFICE
CERTIFICATE OF CORRECTION

PATENT NO.    : 6,288,364 B1
DATED         : September 11, 2001
INVENTOR(S)   : Stephen W. Simpson It is certified that error appears in the above-identified patent and that said Letters Patent is hereby corrected as shown below:

Column 11,
Line 16, at the end thereof, there should be a semicolon.

Column 12,
Line 31, "in" should be -- m --.

Column 13,
In the equation on lines 34, 43, 48 and 50, the dots should be vertically centered.

Column 14,
In the equations on lines 22, 26, 28, 31 and 48, the dots should be vertically centered.

Signed and Sealed this

First Day of April, 2003

JAMES E. ROGAN
*Director of the United States Patent and Trademark Office*